(12) United States Patent
Arora et al.

(10) Patent No.: US 9,431,046 B2
(45) Date of Patent: Aug. 30, 2016

(54) PERPENDICULAR MAGNETIC RECORDING DISK WITH PATTERNED TEMPLATE LAYER

(71) Applicant: HGST Netherlands B.V., Amsterdam (NL)

(72) Inventors: Hitesh Arora, Fremont, CA (US); Andrea Fasoli, San Jose, CA (US); Qing Zhu, Austin, TX (US)

(73) Assignee: HGST Netherlands B.V., Amsterdam (NL)

( * ) Notice: Subject to any disclaimer, the term of this patent is extended or adjusted under 35 U.S.C. 154(b) by 41 days.

(21) Appl. No.: 14/530,469

(22) Filed: Oct. 31, 2014

(65) Prior Publication Data

US 2016/0125904 A1    May 5, 2016

(51) Int. Cl.
*G11B 5/708* (2006.01)
*G11B 5/73* (2006.01)
*G11B 5/64* (2006.01)
*G11B 5/82* (2006.01)

(52) U.S. Cl.
CPC .............. *G11B 5/7325* (2013.01); *G11B 5/645* (2013.01); *G11B 5/82* (2013.01)

(58) Field of Classification Search
CPC .................................................... G11B 5/7325
See application file for complete search history.

(56) References Cited

U.S. PATENT DOCUMENTS

| 7,776,388 | B2 | 8/2010 | Dobisz et al. |
| 8,048,546 | B2 | 11/2011 | Albrecht et al. |
| 8,824,084 | B1 | 9/2014 | Gurney et al. |
| 2006/0014052 | A1* | 1/2006 | Watanabe ............... G11B 5/65 428/842 |
| 2012/0092790 | A1* | 4/2012 | Hellwig ............... G11B 5/746 360/59 |
| 2013/0081937 | A1 | 4/2013 | Albrecht |
| 2013/0084468 | A1 | 4/2013 | Albrecht et al. |
| 2014/0168807 | A1 | 6/2014 | Grobis et al. |
| 2014/0234665 | A1 | 8/2014 | Gurney et al. |

* cited by examiner

*Primary Examiner* — Jie Yang
*Assistant Examiner* — Xiaowei Su
(74) *Attorney, Agent, or Firm* — Thomas R. Berthold

(57) ABSTRACT

A perpendicular magnetic recording (PMR) disk has a patterned template layer for the growth of the magnetic grains and the nonmagnetic material surrounding the grains. The template layer is a substantially planar platinum (Pt) or palladium (Pd) layer that is patterned to have Pt or Pd regions arranged in a hexagonal-close-packed (hcp) pattern with the Pt or Pd regions surrounded by Pt-oxide or Pd-oxide regions. The two separate regions of the template layer have different surface chemistries and energies, which provide a "chemical contrast" to impinging atoms during deposition of the metallic magnetic material and nonmagnetic (typically oxide) material, effectively guiding the deposition. The metallic magnetic material is preferentially deposited on the pristine, epitaxial Pt or Pd regions to form the magnetic grains, while the oxide migrates to the oxidized Pt or Pd regions due to the matching of lower surface energy.

13 Claims, 6 Drawing Sheets

PERPENDICULAR MAGNETIC RECORDING DISK WITH PATTERNED TEMPLATE LAYER

BACKGROUND OF THE INVENTION

1. Field of the Invention

This invention relates generally to perpendicular magnetic recording (PMR) media, such as perpendicular magnetic recording disks for use in magnetic recording hard disk drives, and more particularly to a perpendicular magnetic recording disk with a granular cobalt-alloy recording layer having controlled grain size.

2. Description of the Related Art

In a PMR disk, the recording layer is a layer of granular cobalt-alloy magnetic material that becomes formed into concentric data tracks containing the magnetically recorded data bits when the write head writes on the magnetic material.

FIG. 1 is a schematic of a cross-section of a prior art PMR disk. The disk includes a disk substrate and an optional "soft" or relatively low-coercivity magnetically permeable underlayer (SUL). The SUL serves as a flux return path for the field from the write pole to the return pole of the recording head. The material for the recording layer (RL) is a granular ferromagnetic cobalt (Co) alloy, such as a CoPtCr alloy, with a hexagonal-close-packed (hcp) crystalline structure having the c-axis oriented substantially out-of-plane or perpendicular to the RL. The granular cobalt alloy RL should also have a well-isolated fine-grain structure to produce a high-coercivity ($H_c$) media and to reduce intergranular exchange coupling, which is responsible for high intrinsic media noise. Enhancement of grain segregation in the cobalt alloy RL is achieved by the addition of oxides, including oxides of Si, Ta, Ti, Nb, B, C, and W. These oxides (Ox) tend to precipitate to the grain boundaries as shown in FIG. 1, and together with the elements of the cobalt alloy form nonmagnetic intergranular material. An optional capping layer (CP), such as a granular Co alloy without added oxides or with smaller amounts of oxides than the RL, is typically deposited on the RL to mediate the intergranular coupling of the grains of the RL, and a protective overcoat (OC) such as a layer of amorphous diamond-like carbon is deposited on the CP.

The Co alloy RL has substantially out-of-plane or perpendicular magnetic anisotropy as a result of the c-axis of its hexagonal-close-pack (hcp) crystalline structure being induced to grow substantially perpendicular to the plane of the layer during deposition. To induce this growth of the hcp RL, intermediate layers of ruthenium (Ru1 and Ru2) are located below the RL. Ruthenium (Ru) and certain Ru alloys, such as RuCr, are nonmagnetic hcp materials that induce the growth of the RL. An optional seed layer (SL) may be formed on the SUL prior to deposition of Ru1.

The enhancement of segregation of the magnetic grains in the RL by the additive oxides as segregants is important for achieving high areal density and recording performance. The intergranular Ox segregant material not only decouples intergranular exchange but also exerts control on the size and distribution of the magnetic grains in the RL. Current disk fabrication methods achieve this segregated RL by growing the RL on the Ru2 layer that exhibits columnar growth of the Ru or Ru-alloy grains.

FIG. 2 is a transmission electron microscopy (TEM) image of a portion of the surface of a prior art CoPtCr—SiO$_2$ RL from a disk similar to that shown in FIG. 1. FIG. 2 shows well-segregated CoPtCr magnetic grains separated by intergranular SiO$_2$ (white areas). However, as is apparent from FIG. 2, there is a relatively wide variation in the size of the magnetic grains and thus the grain-to-grain distance. A large grain size distribution is undesirable because it results in a variation in magnetic recording properties across the disk and because some of the smaller grains can be thermally unstable, resulting in loss of data. FIG. 2 also illustrates the randomness of grain locations. Because the nucleation sites during the sputtering deposition are randomly distributed by nature, there is no control of the grain locations. The amount of Ox segregants inside the RL needs to be sufficient to provide adequate grain-to-grain separation, but not too high to destroy the thermal stability of the RL. The typical content of the Ox segregants is about 20% in volume, and the grain boundary thickness is typically between about 1.0 and 1.5 nm.

To achieve high areal density of 1 to 5 Terabits/in$^2$ and beyond in PMR media, it is desirable to have high uniformity (or tighter distribution) of the grains within the RL, mainly for the following three structural parameters: grain diameter (i.e., the diameter of a circle that would have the same area as the grain), grain-to-grain distance (i.e., the distance between the centers of adjacent grains or "pitch") and grain boundary thickness. Narrower distribution of these three structural parameters will lead to narrower distributions of magnetic exchange interaction and magnetic anisotropy strength, both of which are desirable. Thus the prior art RL shown in FIG. 2 is far from ideal. First, the grains have an irregular polygonal shape with a large size distribution. Second, the location of the grain centers is highly random, which means there is no short range or local ordering, i.e., no pattern within approximately 3-5 grain distances. Third, the thickness of the grain boundaries (the Ox segregants seen as white areas in FIG. 2) has an even wider distribution.

In one approach for making PMR disks, sometimes called templated growth, the layers up to but not including the magnetic recording layer and its underlayers (called the magnetic stack) are deposited on the substrate. One type of templated growth uses a seed layer that is then deposited and lithographically patterned and pre-etched (i.e., before the deposition of the magnetic stack) to form a topographic pattern of seed layer pedestals surrounded by seed layer spaces or trenches. The material of the magnetic stack is then deposited on the topographically patterned seed layer, with magnetic material growing on the seed layer pedestals and the nonmagnetic material growing on the seed layer trenches. Another type of templated growth uses two types of seed layer material. A first seed layer is deposited and then lithographically patterned and pre-etched (i.e., before the deposition of the magnetic stack) to form a patterned first seed layer. Then a separate second seed layer is deposited into the etched spaces where there is no first seed layer. The material of the magnetic stack is then deposited on the patterned seed layers, with magnetic material growing on the first seed layer and nonmagnetic material growing on the second seed layer. One example of this approach, as described in U.S. Pat. No. 7,776,388 B2 assigned to the same assignee as this application, has etched ruthenium (Ru) as the first seed layer and oxide spaces as the second seed layer. Magnetic CoPtCr material and nonmagnetic oxide material is then sputter deposited simultaneously, with the CoPtCr growing on the Ru seed layer and the oxide growing on the oxide seed layer.

The etching of the template layer causes re-deposition of the template layer material. Re-deposition occurs when the material being etched is displaced from its original site via physical bombardment or chemical reaction, but cannot be properly volatized and removed in full. The re-deposition causes undesired topography and poor surface texture, which adversely affects the desired size and spacing of the subsequently formed magnetic islands. Also, because the subsequently deposited magnetic material and oxide material will generally replicate the pattern of the template layer, if a topographically patterned template layer is used a planarization process may be required to assure that the completed disk has a generally smooth planar surface.

What is needed is a PMR perpendicular magnetic recording disk with a substantially planar patterned template layer that does not have the disadvantages caused by etching of the template layer material.

SUMMARY OF THE INVENTION

Embodiments of the invention relate to a PMR disk with a patterned template layer for the growth of the magnetic regions and the nonmagnetic material surrounding the magnetic grains. The template layer is a platinum (Pt) or palladium (Pd) layer that is patterned without removal of the Pt or Pd material by etching and has Pt or Pd regions arranged in a hexagonal-close-packed (hcp) pattern with the Pt or Pd regions surrounded by Pt-oxide or Pd-oxide spaces or regions. Surface oxidation of Pt or Pd does not generate any substantial topography. Chemical contrast at the surface is the dominant effect, which causes templating of overlayers deposited on the Pt or Pd layers with oxide patterns. The two separate regions of the template layer are characterized by markedly different surface chemistries and energies, which provide a "chemical contrast" to impinging atoms during deposition of the magnetic material and oxide material, effectively guiding the deposition. The metallic magnetic material and the oxide material tend to wet different surfaces, with the metal being preferentially deposited on the pristine, epitaxial Pt or Pd surface to form the magnetic grains, and the oxide migrating to the oxidized Pt or Pd regions due to the matching of lower surface energy. Thus, the sputter deposited metallic magnetic material and the oxide material spontaneously create distinct magnetic grains arranged in a hcp pattern and nonmagnetic (oxide) regions surrounding the magnetic grains. Additionally, the lattice orientation of the magnetic grains can be guided by the epitaxy of the regions of pristine Pt or Pd material.

For a fuller understanding of the nature and advantages of the present invention, reference should be made to the following detailed description taken together with the accompanying figures.

DETAILED DESCRIPTION OF THE INVENTION

Figure 3:
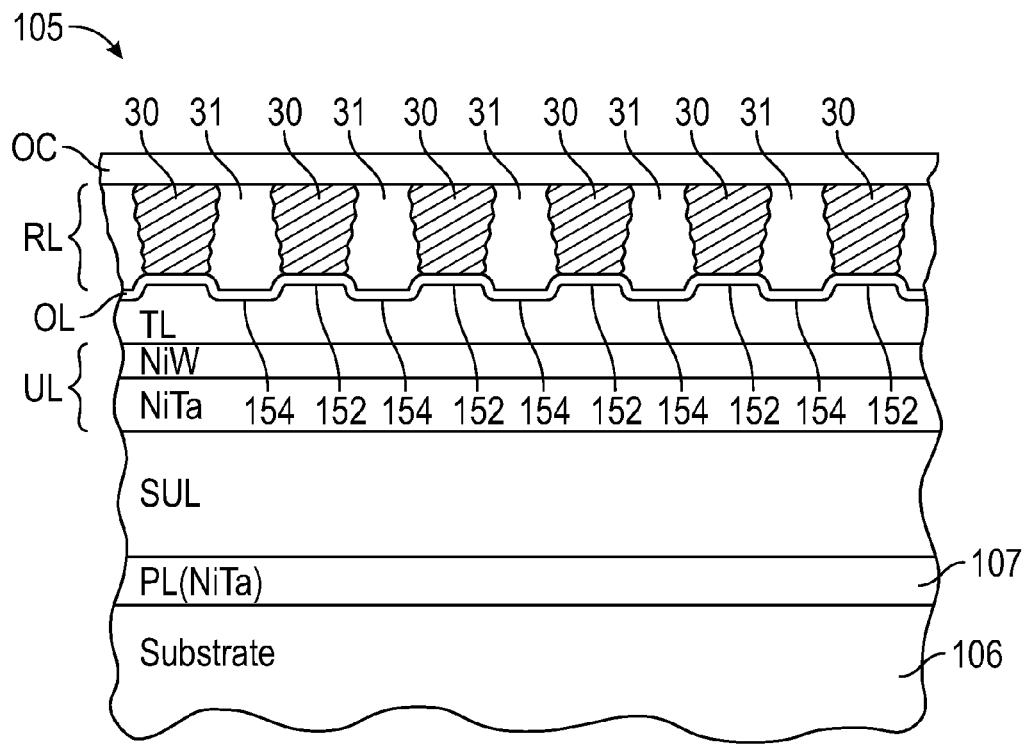
FIG. 3 is a sectional view showing the PMR disk with a patterned template layer according to the prior art.

FIG. 3 is a sectional view showing the PMR disk 105 with a patterned template layer according to the prior art. The disk substrate 106 has a generally planar surface 107 on which the representative layers are deposited, typically by sputtering. The hard disk substrate 106 may be any commercially available glass substrate, but may also be a conventional aluminum alloy with a NiP surface coating, or an alternative substrate, such as silicon, canasite or silicon-carbide.

The optional soft magnetically permeable underlayer (SUL) serves as a flux return path for the magnetic write field from the disk drive write head. If the substrate is glass a planarizing layer (PL), such as a layer of NiTa, may be formed on the substrate surface 107 prior to the deposition of the SUL. The SUL may be formed of magnetically permeable materials such as alloys of CoNiFe, FeCoB, CoCuFe, NiFe, FeAlSi, FeTaN, FeN, FeTaC, CoTaZr, CoFeTaZr, CoFeB, and CoZrNb. The SUL may also be a laminated or multilayered SUL formed of multiple soft magnetic films separated by nonmagnetic films, such as electrically conductive films of Al or CoCr. The SUL may also be a laminated or multilayered SUL formed of multiple soft magnetic films separated by interlayer films that mediate an antiferromagnetic coupling, such as Ru, Ir, or Cr or alloys thereof. The SUL may have a thickness in the range of about 5 to 50 nm.

An underlayer (UL) is deposited on the SUL or other appropriate surface. If the magnetic recording layer is a CoPtCr alloy, the UL may be one or more layers of a material, like a NiTa, NiW or NiWCr alloy, with a thickness in the range of about 2 to 20 nm. In FIG. 3, the UL is a bilayer of NiTa with a thickness in the range of 5 to 100 nm and NiW with a thickness in the range of 2 to 15 nm.

A topographically patterned template layer (TL) 150 that serves as the seed layer for the later growth of the magnetic recording material is deposited on the UL. The TL may be a noble metal like one of the elements from the Pt group (Pt, Pd, Rh, Ir) and Au, or alloys of two or more of those elements. The TL has a thickness in the range of about 1 to 20 nm. The TL 150 has been lithographically patterned and etched to form a topographic pattern with elevated pedestals 152 separated by recessed spaces or trenches 154. An optional thin overlayer (OL), for example a layer of ruthenium (Ru) with a thickness between about 5 to 20 nm, may be deposited on the topographically patterned TL.

For Co based magnetic recording layers, including alloys of CoPt like CoPtCr, CoPd and CoNi that require a hexagonal-close packed (hcp) crystalline orientation to achieve perpendicular anisotropy, the TL has a face-centered-cubic (fcc) crystalline structure and grows on top of the UL with the (111) plane normal to the layer growth direction. Additionally, materials with other than a fcc crystalline structure can be used for the TL, such as Ru and Ti, as is known in the art, to provide a surface structure and lattice parameter favoring the substantially epitaxial hcp growth of the above magnetic layers. The Co based alloy recording layer (RL) contains one or more segregants, typically an oxide like oxides of one or more of Si, Ta, Ti and Nb. The Co alloy material and oxide material of the recording layer (RL) is sputter deposited on the topographically patterned TL (or optional OL). The Co alloy forms the magnetic regions 30 on the pedestals 152 of the TL while the oxides form the nonmagnetic regions 31 on the spaces or trenches 154 between the pedestals. A conventional protective overcoat (OC) such as a layer of amorphous diamond-like carbon is typically deposited on the RL.

The method of forming the topographically patterned TL by etching through a lithographically patterned mask causes re-deposition of the TL material. Re-deposition occurs when the material being etched is displaced from its original site via physical bombardment or chemical reaction, but cannot be properly volatized and removed in full. The remaining material can land either in the etched trenches, thereby shrinking the pedestals' edge-to-edge distance, or on top of the pedestals being etched, giving rise to undesired topography and poor surface texture. This process can dramatically limit the maximum etch depth achievable before severe pattern degradation occurs. Thus the subsequently deposited Co alloy material and oxide material will form magnetic grains and nonmagnetic oxide regions of different sizes and spacings that do not result in a uniform distribution. Also, because the subsequently deposited Co alloy material and oxide material, as well as the OC, will generally replicate the topographic pattern of the TL, a planarization process may be required to assure that the completed disk has a generally smooth planar surface.

Figure 4:
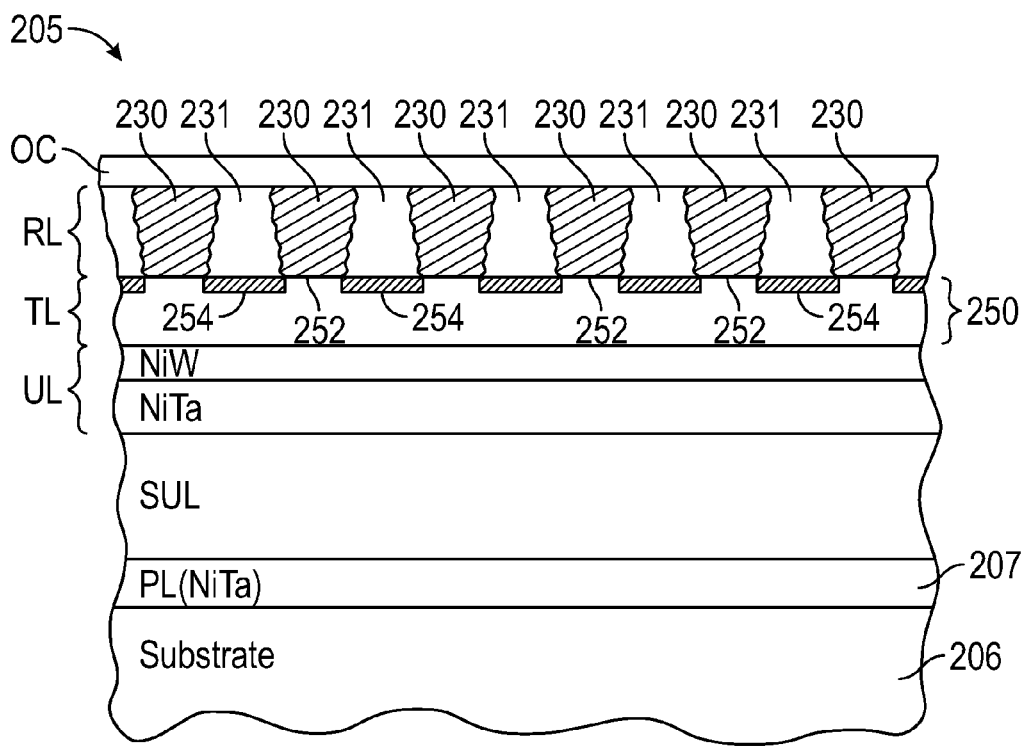
FIG. 4 is a sectional view showing a PMR disk with a patterned template layer according to an embodiment of the invention.

Embodiments of this invention relate to a magnetic recording disk like that shown in FIG. 3, but with a novel patterned template layer (TL) that serves as a seed layer for the deposition of the Co alloy material and oxide material. FIG. 4 is a sectional view showing a disk 205 with substrate 206 having a generally planar surface 207 and with a patterned TL 250 according to an embodiment of the invention. The TL 250 has a substantially planar surface without any topographic pattern and includes patterned regions 252 of platinum (Pt), or alternatively palladium (Pd), separated by spaces or regions 254 of Pt-oxide, or alternatively Pd-oxide. The Co alloy material and oxide material of the RL is sputter deposited on the patterned TL 250. The Co alloy forms as magnetic grains 230 on the regions 252 while the oxides form as the nonmagnetic regions 231 on the oxide regions 254.

Figure 5A:
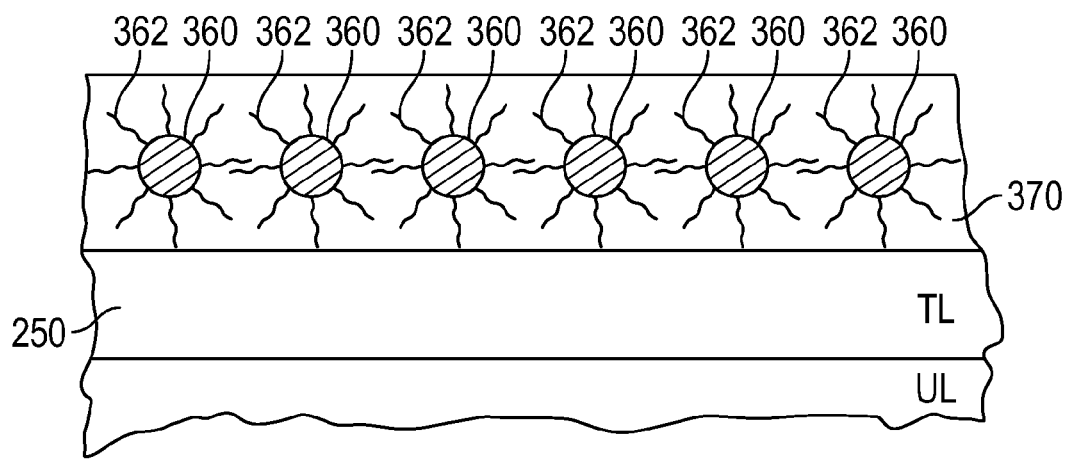
FIGS. 5A-5E are views illustrating a method of forming the template layer according to an embodiment of the invention.
Figure 5B:
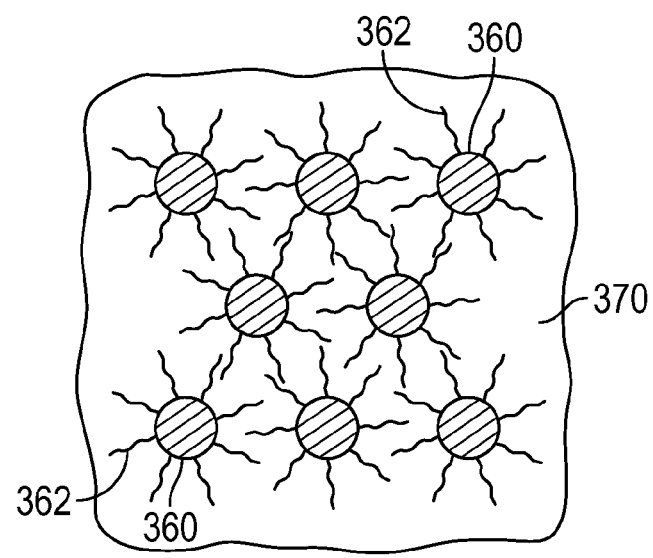

FIGS. 5A-5E are views for illustrating a method of forming the TL 250 according to an embodiment of the invention. In FIG. 5A a layer of nanoparticles 360 with attached ligands 362 in a polymer material 370 has been formed on the surface of the underlayer (UL), which may be a NiW layer as described in the prior art of FIG. 3. Nanoparticles (also called nanocrystals) include small sub-100 nm sized crystalline particles composed of materials such as CdSe, CdTe, PbSe, FePt, iron oxide (FeOx), Si, ZnO, Au, Ru, Cu, Ag, and vanadium oxide ($VO_x$). Nanoparticles can be synthesized in a variety of sizes and with narrow size distributions. For example, CdSe nanoparticles are commercially available with diameters ranging from 2-7 nm. Other semiconductor nanoparticles are also available. This includes III-V semiconductors as described in D. V. Talapin, *MRS Bulletin* 37, 63-71 (2012) and in Green, "Solution routes to III-V semiconductor quantum dots", *Current Opinion in Solid State and Materials Science* 6, pp. 355-363 (1052).

An embodiment of the invention will be described for an example where the nanoparticles 360 are iron-oxide ($Fe_3O_4$), and the ligands are polystyrene with an end group of pentaethylene hexamine (PEHA) attached to the iron oxide nanoparticles. A film comprising $Fe_3O_4$ nanoparticles 360 embedded in the polymer material 370 is formed on the Pt or Pd TL 250 surface. The attached polystyrene chains 362 separate the nanoparticles 360. The film is formed by spin coating a solution of the nanoparticles and polymer material on the substrate surface and allowing the solution dry, although other methods of dispersal are possible. $Fe_3O_4$ nanocrystals with a diameter of between about 1-10 nm and having polystyrene ligands with molecular weight between about 0.3-10 kg/mol are dissolved in toluene (or other solvent) at a concentration of about 1 to 25 mg/ml. A single layer of $Fe_3O_4$ nanoparticles can be formed across the substrate surface with relatively high uniformity by proper selection of the concentration of nanoparticles in the toluene solution and the spinning speed. During this process, the ligand molecules form a continuous matrix of polystyrene, within which the $Fe_3O_4$ nanoparticles are embedded. The process for forming the film of $Fe_3O_4$ nanoparticles embedded in the matrix of polymer material to form a single layer of generally uniformly distributed $Fe_3O_4$ nanoparticles is described by Fischer et al., "Completely Miscible Nanocomposites", *Angew. Chem. Int. Ed.* 2011, 50, 7811-7814.

After the solution has been applied to the TL surface the structure is solvent annealed or thermally annealed, or both, for example by exposing the spin-coated film to a toluene (or other solvent) vapor or by thermally annealing at about 100-200° C. This facilitates the self-assembly of the nanoparticles into a substantially hexagonal-close packed (hcp) pattern, as shown by the top view of FIG. 5B. The solvent annealing step adjusts the ordering of the array of nanoparticles. Solvent annealing is performed in an enclosed chamber filled with toluene vapor for a certain period of time, for example 30 minutes. During the solvent annealing process, toluene vapor penetrates the polystyrene matrix and causes swelling of the film. When the polystyrene swells, the $Fe_3O_4$ nanoparticles are able to move around and re-assemble to form a more uniform hcp pattern. The distribution of particle-to-particle distance can be controlled by the solvent annealing step. For example, as-spun particles normally have a distribution with standard deviation around 12-18%, and particles solvent annealed for 30 minutes have a distribution with standard deviation around 8-12%. Solvent annealing for an even longer time may achieve an even smaller distribution.

The density of the nanoparticles, and thus the density of the subsequently formed magnetic grains, is determined by the nanoparticle size and the length of the ligands, which is a function of the molecular weight of the polymer material. For example, if the nanoparticles have a diameter of 4 nm and the polystyrene has a molecular weight of 3 kg/mol, then the density of the nanoparticles in the hcp pattern is about $600 \times 10^{10}$ dots/in$^2$.

Figure 5C:
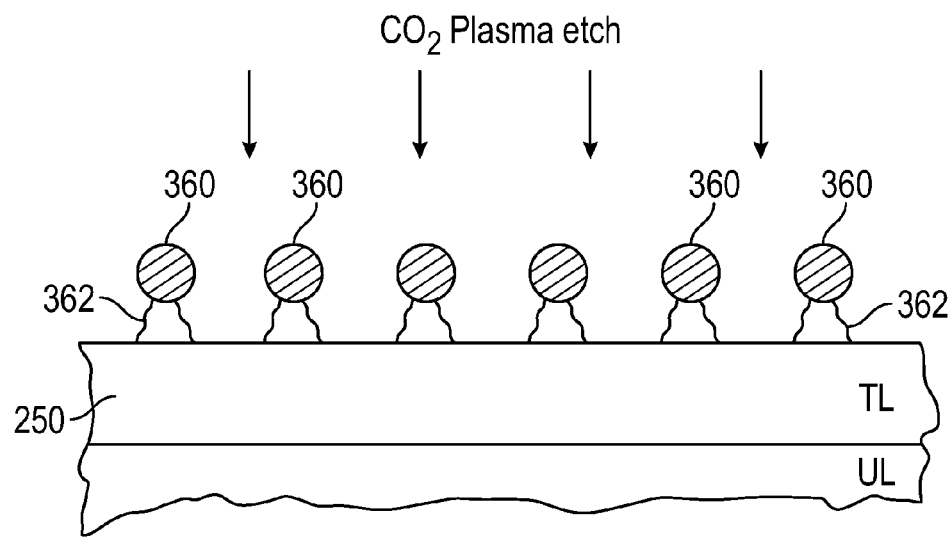
Figure 5D:
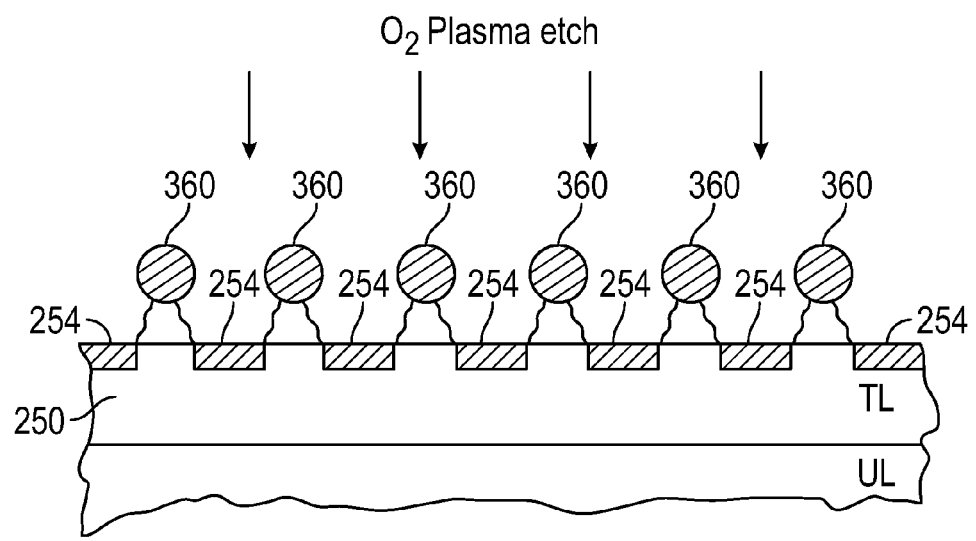

FIG. 5C illustrates the step of etching away the polymer material 370 of the film shown in FIG. 5A, leaving the hcp pattern of $Fe_3O_4$ nanoparticles 360. In the preferred method, a carbon dioxide ($CO_2$) plasma etching is performed. The $CO_2$ plasma reacts with the polystyrene chains and turns them into gas and water vapor, which are pumped away. Because the nanoparticles are an oxide the $CO_2$ plasma does not significantly affect them in the short time (about 2 to 20 sec) needed to etch the ligands. The $CO_2$ plasma does not affect the Pt or Pd, which are noble metals. The directionality of the $CO_2$ plasma ensures that ligands below the nanoparticles are not removed. The nanoparticles act as a hard mask, which screens the underlying ligands from the plasma etch species. During the etch process, the removal of the non-screened ligands partially disrupts the order of the nanoparticle template. Use of $CO_2$ plasma minimizes the disruption, limiting the broadening of particle-to-particle distance distribution to about 2-3%. Next, in FIG. 5D, the structure is exposed to an oxygen ($O_2$) plasma to oxidize the Pt or Pd in regions not protected by the nanoparticles 360. This creates the nonmagnetic oxide regions 254. Pt and Pd are noble metals that do not oxidize at room temperature but form oxides ($PtO_2$ and $PdO_2$) when exposed to oxygen plasma. As an alternative to the two-step process of the $CO_2$ plasma etching followed by the $O_2$ plasma etching, a single $O_2$ plasma etching may be performed to simultaneously remove the polystyrene and oxidize the unprotected regions of the Pt or Pd TL. The advantage of the two-step plasma etching process is that it minimizes the broadening of the particle-to-particle distance distribution, allowing for a significantly more ordered template than the single-step etch process. Next in FIG. 5E, the nanoparticles are removed by a wet etch in a hydrochloric acid (HCl) solution, leaving the TL 250 with a pattern of Pt or Pd regions 252 separated by Pt oxide or Pd oxide regions 254. The Pt oxide or Pd oxide regions 254 are oxidized to only a small portion of the total TL thickness and are coplanar with the Pt or Pd regions 252 so that the TL 250 presents a substantially planar surface. An advantage of the use of a noble metal (Pt or Pd) is that the TL 250 will not oxidize when exposed to the atmosphere during the processing steps.

Figure 5E:
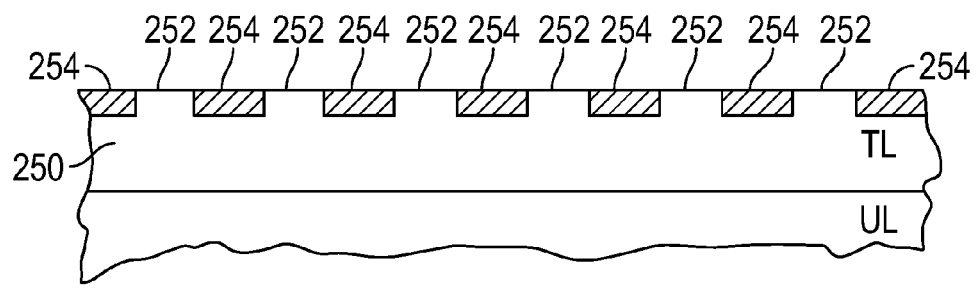

After the TL 250 has been patterned as shown in FIG. 5E, the RL material of the Co alloy material and oxide material is sputter deposited onto the patterned TL. The two separate regions of the TL are characterized by markedly different surface chemistries and energies, which provide a "chemical contrast" to impinging atoms during deposition of the magnetic material and oxide material, effectively guiding the deposition. The Co alloy metallic magnetic material and the oxide material tend to wet different surfaces, with the metal being preferentially deposited on the pristine, epitaxial Pt or Pd seed surface, and the oxide migrating towards the oxidized Pt or Pd regions due to the matching of lower surface energy. Thus, the sputter deposited Co alloy metal material and the oxide material spontaneously create distinct magnetic and nonmagnetic (oxide) regions. Additionally, the lattice orientation of the magnetic grains can be guided by the epitaxy of the regions of pristine Pt or Pd seed material. The formation of the RL in this manner is then followed by deposition of the overcoat (OC). This results in the PMR disk as shown in FIG. 4. Because the disk with the TL according to embodiments of this invention is not fabricated by etching away portions of the TL, there is no alteration of the desired size and spacing of the subsequently deposited magnetic grains. Also because the Pt or Pd regions and the oxidized Pt or Pd regions of the TL are coplanar, the TL has a substantially planar surface so there is no need for a planarization process.

Figure 1:
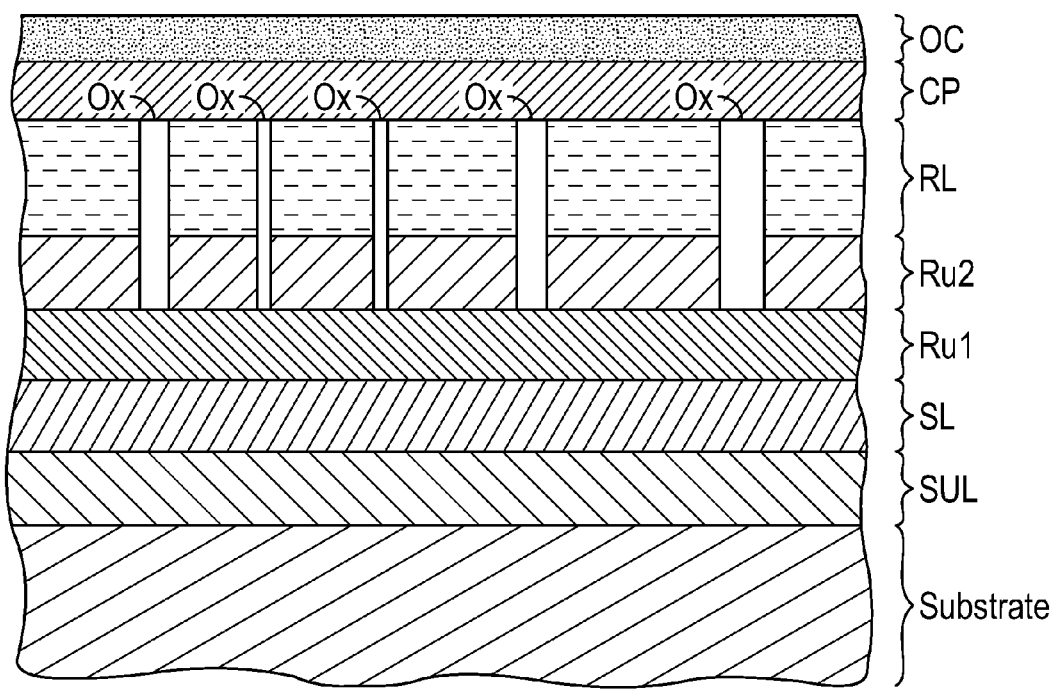
FIG. 1 is a schematic of a cross-section of a perpendicular magnetic recording disk according to the prior art.
Figure 2:
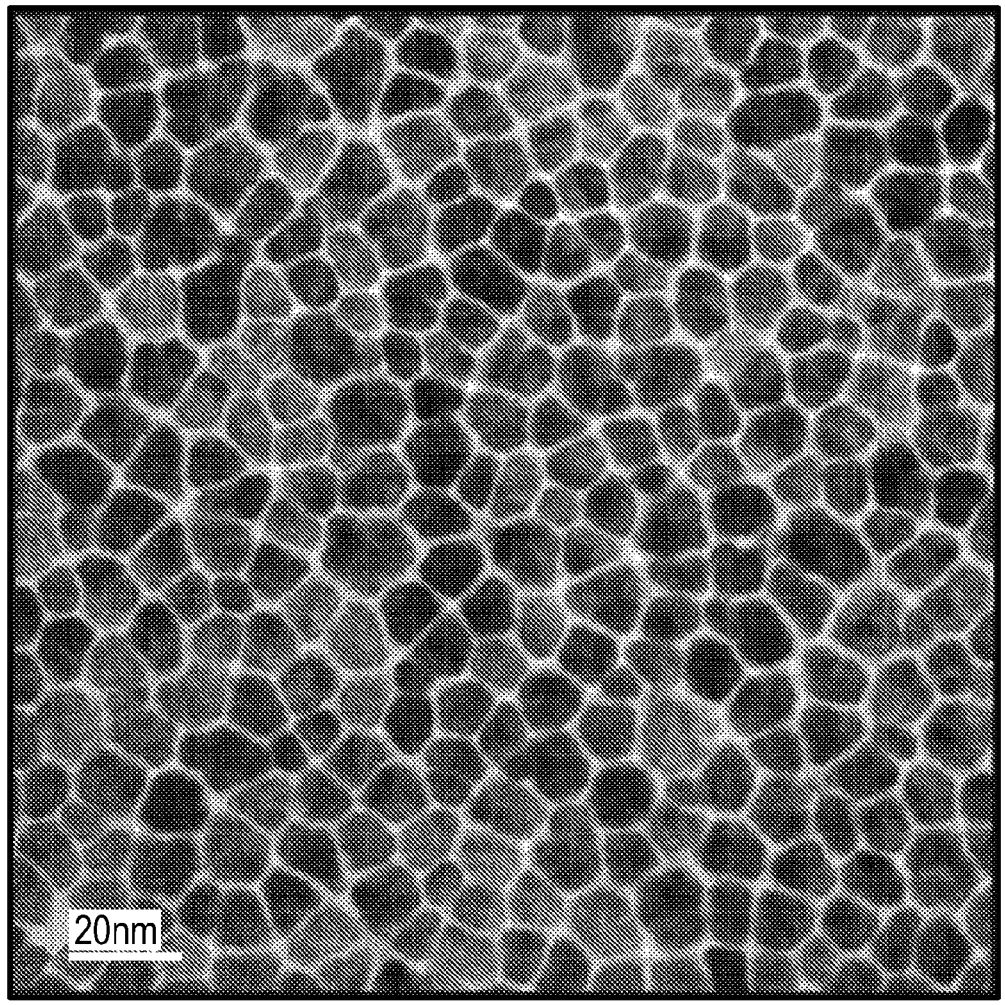
FIG. 2 is a transmission electron microscopy (TEM) image of a portion of a surface of a CoPtCr—SiO$_2$ recording layer of a prior art perpendicular magnetic recording disk similar to the disk depicted in FIG. 1.
Figure 6:
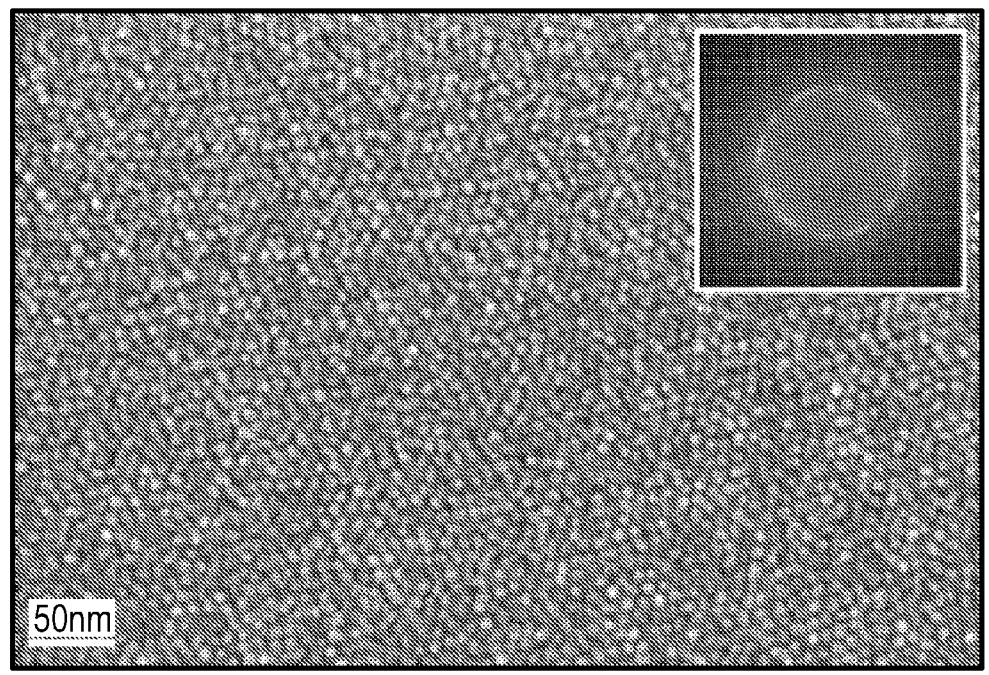
FIG. 6 is a scanning electron microscopy (SEM) image of a portion of a surface of a CoPtCr—SiO$_2$ recording layer of a PMR disk according to an embodiment of the invention.

FIG. 6 is a scanning electron microscopy (SEM) image of a portion of a surface of a $CoPtCr$—$SiO_2$ recording layer of a PMR disk according to an embodiment of the invention. The small white and gray circular regions are the CoPtCr magnetic grains and the darker areas are the oxide regions between the grains. This image shows a much smaller grain size and much better uniformity in grain size and grain distribution than the prior art image of FIG. 2. This image also shows much more uniformity in the thickness of the grain boundaries (the thickness of the oxide segregants) than the prior art image of FIG. 2.

While the RL has been described with Co alloy magnetic grains separated by oxides, the RL may also be formed with magnetic grains of a substantially chemically-ordered FePt alloy, i.e., a FePt alloy with a composition of the form $Fe_{(y)}Pt_{(100-y)}$ where y is between about 45 and 55 atomic percent. This FePt alloy is ordered in $L1_0$ and is known for its high magneto-crystalline anisotropy and magnetization and is thus proposed for use in heat-assisted magnetic recording (HAMR) disk drives. The c-axis of the $L1_0$ phase is the easy axis of magnetization and is oriented perpendicular to the disk substrate. The RL with FePt alloy magnetic grains would also include an oxide segregant, such as one or more of $SiO_2$, $TiO_2$, $Ta_2O_5$, with the oxide material forming on the Pt or Pd oxide regions 254 of the TL. The RL may also be formed of a substantially chemically ordered CoPt alloy of the form $Co_{(x)}Pt_{(1-x)}$, where x is between about 0.45 and 0.55, as the magnetic grains on the Pt or Pd regions 252 and one or more of $SiO_2$, $TiO_2$ and $Ta_2O_5$ as the nonmagnetic material on the Pt or Pd oxide regions 254. The CoPt alloy is ordered in the L11 phase and is known for its high magnetocrystalline anisotropy.

The patterned template layer (TL) for the PMR disk according to embodiments of this invention has been described as being formed using $Fe_3O_4$ nanoparticles embedded in a polymer material of polystyrene with a functional end group of PEHA. However, examples of other nanoparticles include, but are not limited to, zinc-oxide (ZnO), silver (Ag), gold (Au), cadmium selenide (CdSe), cobalt (Co), iron-platinum (FePt), copper (Cu), and vanadium oxide (VOx) (e.g., $VO_2$, $V_2O_3$, $V_2O_5$). Examples of other polymers include, but are not limited to, polydimethyl siloxane, polysiloxane, polyisoprene, polybutadiene, polyisobutylene polypropylene glycol, and polyethylene glycol. Examples of other functional end groups for the polymers include, but are not limited to, carbocyl group (COOH), hydroxyl group (OH), amino group ($NH(CH_2)_2NH_2$) and thiol group (CSH).

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A perpendicular magnetic recording disk comprising:
   a substrate;
   a substantially planar template layer on the substrate comprising patterned regions selected from the group consisting of Pt and Pd arranged in a substantially hexagonal-close packed (hcp) pattern and surrounded by oxide regions of said selected Pt or Pd; and
   a perpendicular magnetic recording layer on the template layer and comprising a ferromagnetic alloy and one or more oxides selected from the group consisting of oxides of Si, Ta, Ti and Nb; wherein said ferromagnetic alloy is formed substantially on said selected Pt or Pd patterned regions and said recording layer oxides are formed substantially on said template layer oxide regions.

2. The disk of claim 1 wherein the ferromagnetic alloy is an alloy comprising Co, Pt and Cr.

3. The disk of claim 1 wherein the ferromagnetic alloy is a FePt alloy with a composition of the form $Fe_{(y)}Pt_{(100-y)}$, where y is between about 45 and 55 atomic percent.

4. The disk of claim 1 wherein the ferromagnetic alloy is a CoPt alloy of the form $Co_{(x)}Pt_{(100-x)}$, where x is between about 45 and 55 atomic percent.

5. The disk of claim 1 further comprising an underlayer on the substrate and selected from the group consisting of an alloy of Ni and Ta, an alloy of Ni and W and an alloy of Ni, W and Cr; wherein the template layer is on and in contact with said underlayer.

6. The disk of claim 5 wherein the underlayer comprises a bilayer of a NiTa alloy layer and a NiW alloy layer on the NiTa alloy layer; and wherein the template layer is on and in contact with the NiW alloy layer.

7. The disk of claim 1 wherein said selected Pt or Pd patterned regions are Pt patterned regions.

8. A perpendicular magnetic recording disk comprising:
a substrate;
an underlayer on the substrate;
a substantially planar template layer on the underlayer, the template layer having metal regions selected from the group consisting of Pt and Pd arranged in a substantially hexagonal-close packed (hcp) pattern and surrounded by oxide regions of said selected Pt or Pd; and
a perpendicular magnetic recording layer on the template layer and comprising Co alloy ferromagnetic grains formed on said selected Pt or Pd regions and one or more oxides selected from the group consisting of oxides of Si, Ta, Ti and Nb formed on said template layer oxide regions.

9. The disk of claim 8 wherein the underlayer is selected from the group consisting of an alloy of Ni and Ta, an alloy of Ni and W and an alloy of Ni, W and Cr.

10. The disk of claim 9 wherein the underlayer comprises a bilayer of a NiTa alloy layer and a NiW alloy layer on the NiTa alloy layer.

11. The disk of claim 8 wherein said selected metal regions are Pt regions.

12. The disk of claim 8 wherein said Co alloy ferromagnetic grains comprise CoPtCr alloy grains.

13. The disk of claim 8 further comprising a protective overcoat on the recording layer.

* * * * *